(12) United States Patent
Ayer et al.

(10) Patent No.: US 8,426,033 B2
(45) Date of Patent: Apr. 23, 2013

(54) HIGH STRENGTH NICKEL ALLOY WELDS THROUGH PRECIPITATION HARDENING

(75) Inventors: Raghavan Ayer, Basking Ridge, NJ (US); Neeraj Srinivas Thirumalai, Easton, PA (US); Hyun-Woo Jin, Easton, PA (US); Daniel B. Lillig, Sugar Land, TX (US); Douglas Paul Fairchild, Sugar Land, TX (US); Steven Jeffrey Ford, Missouri City, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 556 days.

(21) Appl. No.: 12/316,710

(22) Filed: Dec. 16, 2008

(65) Prior Publication Data

US 2009/0155623 A1    Jun. 18, 2009

Related U.S. Application Data

(60) Provisional application No. 61/007,994, filed on Dec. 17, 2007.

(51) Int. Cl.
*B32B 15/18*    (2006.01)

(52) U.S. Cl.
USPC ........... 428/679; 428/678; 428/680; 428/681; 420/445; 420/446; 420/447; 420/448; 420/451; 420/460; 228/101; 219/121.13; 219/121.36; 219/121.63; 219/121.85; 148/428; 148/429

(58) Field of Classification Search .................. 228/101; 219/121.11, 121.12, 121.13, 121.36, 121.63, 219/121.65, 121.85; 148/428, 447, 448, 148/540, 579, 669, 675; 428/650
See application file for complete search history.

(56) References Cited

U.S. PATENT DOCUMENTS

| | | | | |
|---|---|---|---|---|
| 4,888,253 A | * | 12/1989 | Snyder et al. | 428/680 |
| 4,981,644 A | * | 1/1991 | Chang | 420/442 |
| 5,374,319 A | * | 12/1994 | Stueber et al. | 148/404 |
| 6,365,867 B1 | * | 4/2002 | Hooper | 219/121.45 |
| 6,708,867 B2 | * | 3/2004 | Yoshinaga | 228/112.1 |
| 7,393,597 B2 | * | 7/2008 | Ogawa et al. | 428/681 |
| 2003/0180174 A1 | * | 9/2003 | Ishikawa et al. | 420/124 |
| 2004/0238599 A1 | * | 12/2004 | Subramanian et al. | 228/112.1 |
| 2006/0191606 A1 | * | 8/2006 | Ogawa et al. | 148/327 |
| 2007/0181647 A1 | | 8/2007 | Ford et al. | |

OTHER PUBLICATIONS

U.S. Appl. No. 11/901,488, filed Sep. 19, 2007, ExxonMobil Research & Eng.
U.S. Appl. No. 61/007,993, filed Dec. 12, 2007, ExxonMobil Research & Eng.

\* cited by examiner

*Primary Examiner* — Jennifer McNeil
*Assistant Examiner* — Daniel J Schleis
(74) *Attorney, Agent, or Firm* — Robert A. Migliorini

(57) ABSTRACT

Provided are precipitation hardened high strength nickel based alloy welds that yield improved properties and performance in joining high strength metals. The advantageous weldments include two or more segments of ferrous or non-ferrous components, and fusion welds, friction stir welds, electron beam welds, laser beam welds, or a combination thereof bonding adjacent segments of the components together, wherein the welds comprise a precipitation hardened nickel based alloy weld metal composition including greater than or equal to 1.4 wt % of combined aluminum and titanium based on the total weight of the nickel based alloy weld metal composition. Also provided are methods for forming the welds from the nickel based alloy weld compositions, wherein the precipitation hardening occurs in the as-welded condition. The nickel based welds do not require a separate heat treatment step after welding to produce advantageous strength properties.

47 Claims, No Drawings

HIGH STRENGTH NICKEL ALLOY WELDS THROUGH PRECIPITATION HARDENING

CROSS-REFERENCE TO RELATED APPLICATIONS

This is a Non-Provisional Application that claims priority to U.S. Provisional Application 61/007,994 filed Dec. 17, 2007, which is herein incorporated by reference.

FIELD

The present disclosure relates generally to the field of welding of steel structures and components. More specifically, the present disclosure relates to welding of steel structures and components with nickel based weld metals that undergo precipitation hardening to achieve high performance joints.

BACKGROUND OF THE INVENTION

For convenience, various welding terms used in this specification are defined in the Glossary of Terms below.

GLOSSARY OF TERMS

CRA: Corrosion resistant alloys. A specially formulated material used for completion components likely to present corrosion problems. Corrosion-resistant alloys may be formulated for a wide range of aggressive conditions.

HAZ: Heat-affected-zone.

Heat-affected-zone: Base metal that is adjacent to the weld line and that was affected by the heat of welding.

Toughness: Resistance to fracture initiation.

Fatigue: Resistance to fracture under cyclic loading.

Fretting fatigue: Fretting involves contact between surfaces undergoing small cyclic relative tangential motion. Fretting fatigue resistance is resistance to fracture in a notched metal parts or metal parts with holes.

Yield Strength: Ability to bear load without deformation.

FS: Friction stir.

FSW: Friction stir welding.

Friction Stir Welding: A solid state joining process for creating a welded joint between two work pieces in which the heat for joining the metal work pieces is generated by plunging a rotating pin of a tool between the work pieces.

FSP: Friction stir processing.

Friction stir processing: The method of processing and conditioning the surface of a structure by pressing a FSW tool against the surface by partially plunging a pin into the structure.

Weld joint: A welded joint including the fused or thermo-mechanically altered metal and the base metal in the "near vicinity" of, but beyond the fused metal. The portion of the base metal that is considered within the "near vicinity" of the fused metal varies depending on factors known to those in the welding art.

Weldment: An assembly of component parts joined by welding.

Weldability: The feasibility of welding a particular metal or alloy. A number of factors affect weldability including chemistry, surface finish, heat-treating tendencies and the like.

Carbon equivalent: A parameter used to define weldability of steels and expressed by the formula $CE=C+Mn/6+(Cr+Mo+V)/5+(Ni+Cu)/15$ where all units are in weight percent.

Hydrogen cracking: Cracking that occurs in the weld subsequent to welding.

TMAZ: Thermo-mechanically affected zone.

Thermo-mechanically affected zone: Region of the joint that has experienced both temperature cycling and plastic deformation.

TMAZ-HZ: The hardest region in a weldment.

LNG: Liquefied natural gas. Gas, mainly methane, liquefied under atmospheric pressure and low temperature.

CNG: Compressed natural gas. Natural gas in high-pressure surface containers that is highly compressed (though not to the point of liquefaction).

PLNG: Pressurized liquefied natural gas. Gas, mainly methane, liquefied under moderate pressure and low temperature (higher temperature than LNG).

SCR: Steel catenary riser. A deepwater steel riser suspended in a single catenary from a platform and connected horizontally on the seabed.

TTR: Top tension riser. A riser on offshore oil rigs which is placed in tension to maintain even pressure on marine riser pipe.

Invar: An alloy of iron and nickel specifically designed to have low coefficient of thermal expansion.

Duplex: Steel consisting of two phases, specifically austenite and ferrite.

Trees: The assembly of valves, pipes, and fittings used to control the flow of oil and gas from a well.

BOP: Blow Out Preventer. The equipment installed at the wellhead to control pressures in the annular space between the casing and drill pipe or tubing during drilling, completion, and work over operations.

OCTG: Oil Country Tubular Goods. A term applied to casing, tubing, plain-end casing liners, pup joints, couplings, connectors and plain-end drill pipe.

Semi-submersibles: Mobile drilling platform with floats or pontoons submerged to give stability while operating. Used in deeper waters down to 360 meters or more. Kept in position by anchors or dynamic positioning.

Jack-up rigs: Mobile drilling platform with retractable legs used in shallow waters less than 100 meters deep.

TLP: Tension Leg Platform. A floating offshore structure held in position by a number of tension-maintaining cables anchored to seabed. Cables dampen wave action to keep platform stationary.

DDCV: Deep Draft Caisson Vessel. Deep draft surface piercing cylinder type of floater, particularly well adapted to deepwater, which accommodates drilling, top tensioned risers and dry completions.

Compliant towers: Narrow, flexible towers and a piled foundation supporting a conventional deck for drilling and production operations. Designed to sustain significant lateral deflections and forces, and are typically used in water depths ranging from 1,500 to 3,000 feet (450 to 900 m).

FPSO: Floating Production Storage and Offloading vessel. A converted or custom-built ship-shaped floater, employed to process oil and gas and for temporary storage of the oil prior to transshipment.

FSO: Floating Storage and Offloading vessel. A floating storage device, usually for oil, commonly used where it is not possible or efficient to lay a pipe-line to the shore. The production platform will transfer the oil to the FSO where it will be stored until a tanker arrives and connects to the FSO to offload it.

Tendons: Tubular tethers that permanently moor a floating platform attached at each of the structure's corners.

Umbilicals: An assembly of hydraulic hoses which can also include electrical cables or optic fibers, used to control a subsea structure or ROV from a platform or a vessel.

Tender vessels: A support/supply ship for carrying passengers and supplies to and from facilities close to shore.

Precipitation hardening: Technique used to strengthen malleable materials that relies on changes in solid solubility with temperature to produce fine particles of a second phase, which impede the movement of dislocations, or defects in a crystal's lattice. Since dislocations are often the dominant carriers of plasticity, this serves to harden the material. Also referred to as age hardening. Precipitation hardening typically involves a heat treatment or aging at low temperature to facilitate formation of precipitates. However, as used in this disclosure, precipitation hardening does not include a heat treatment or aging step, but occurs in a weld upon cooling; i.e. in the as-welded condition.

X-65: A line pipe steel with a yield strength of 65 Ksi (65,000 psi).

Electron beam welding (EBW): A welding process in which a beam of high-velocity electrons is applied to the materials being joined. The workpieces melt as the kinetic energy of the electrons is transformed into heat upon impact, and the filler metal, if used, also melts to form part of the weld. Pressure is not applied, and a shielding gas is not used, though the welding is often done in conditions of a vacuum to prevent dispersion of the electron beam.

Laser beam welding (LBW): A welding process used to join multiple pieces of metal through the use of a laser. The beam provides a concentrated heat source, allowing for narrow, deep welds and high welding rates.

Long-Felt Need

Most steel structures are welded with steel (also referred to as ferrous-based, or iron-based) weld metals. These steel welds are generally iron with about 0.1 wt % carbon and up to 2 to 3 wt % of other alloying elements, such as Mn, Ni, Cu and combinations thereof. The toughness and residual stresses that are developed in these ferrous welds/weldments are the result of complex interactions of the properties of the base steel, the type of weld metal, and the thermal cycles associated with the welding process. The performance of most welded structures (e.g. load bearing ability, fatigue, environmental cracking) is controlled by the properties of the weldments, which consist of the weld and the heat affected zone (HAZ). Although the properties of the weld can be controlled by the design of the weld metal chemistry, the joint performance is dictated by a complex interaction between base/ weld metal chemistries and the weld procedure. Historically, most steel structures are joined by fusion welding using iron-based weld metals. The primary reasons for the use of iron-base welds have been their low cost, the ability to match the strength of the base metal through alloying, and extensive use in the industry.

Although deficiencies in weldment integrity for many land-based structural applications can be accommodated through enhanced redundancy, such an approach is not practical or economical for offshore and deepwater structures where component weight is critical. In these structures, it is necessary to enhance the weldment integrity so that they are not limiting the integrity of the structure. The joining of metal parts such as pipes and tubes to form pipelines for oil, gas and geothermal wells and the like is largely performed by conventional arc or fusion welding of steel structures or components with these conventional iron-based weld metals. Arc or fusion welding typically involves the melting of a steel weld metal to create the joint joining of two ferrous components or parts.

Such ferrous-based metal joints typically have acceptable properties, however improvements in strength, toughness and integrity of the weldment would further improve weldment performance, and correspondingly structure/component performance. For example, in welding steel pipes for offshore pipelines with ferrous-based weldments, there is the problem of bending stresses that results from the completed pipe hanging off the stem of the laybarge. In addition, conventional ferrous-based fusion welded joints suffer from other attributes which degrade the mechanical integrity of the joints. Examples of such attributes are tensile residual stress, hydrogen cracking, lack of fusion defects and low toughness.

Nickel alloy welds comprised of Inconel 625 are used to weld some high strength steels (e.g. X-65 steel pipe) to yield superior fatigue strength of the weldment. In these joints, the yield strength of the Inconel 625 alloy (about 70 Ksi) is greater than the yield strength of the X-65 steel (65 Ksi) to be welded, which provides for an overmatched condition. The primary origin of this fatigue strength enhancement of the joint arises from the superior fatigue properties of the Inconel 625 nickel alloy welds. However, when welding higher strength steel pipes (e.g. X-80 steel—yield strength of 80 Ksi (551.6 MPa)), Inconel 625 does not provide for an overmatched condition. Hence there is a need for novel weld metal compositions and methods of forming such compositions that provide for higher yield strength than the weld metal compositions currently known in the art in order to provide improved properties to the weldment. More particularly, there is a need for higher strength nickel alloy weld metal compositions for use in joining high strength ferrous and non-ferrous substrates to provide an overmatched condition and an improvement in weldment fatigue properties and performance without heat treatment.

SUMMARY

Broadly stated, the present disclosure provides the use of weld metals that are made of nickel based alloys in which the strengthening comes from sources other than carbon to improve weldment properties and performance in joining steel components and structures. More particularly, the improved weldment properties are achieved through the use of nickel based compositions that undergo precipitation hardening during weldment cooling to improve properties, and hence find particular application in joining high strength structures.

In one form of the present disclosure is provided an advantageous weldment comprising: two or more segments of ferrous or non-ferrous components, and fusion welds, friction stir welds, electron beam welds, laser beam welds, or a combination thereof bonding adjacent segments of the components together, wherein the welds comprise a precipitation hardened nickel based alloy weld metal composition including greater than or equal to 1.4 wt % of aluminum and titanium combined based on the total weight of the nickel based alloy weld metal composition.

In another form of the present disclosure is provided an advantageous method of joining two or more metal structures comprising: providing two or more segments of ferrous or non-ferrous components, and fusion welding, friction stir welding, electron beam welding, laser beam welding, or a combination thereof adjacent segments of the components together, wherein the welds comprise a precipitation hardened nickel based alloy weld metal composition including greater than or equal to 1.4 wt % aluminum and titanium combined based on the total weight of the precipitation hardened nickel based alloy weld metal composition.

In still another form of the present disclosure is provided an advantageous method for welding two or more ferrous or non-ferrous components to produce a weld having a specific property or set of properties chosen for an intended application, the method comprising: obtaining a data base of weld properties for nickel based welds formed by fusion welding, friction stir welding, electron beam welding, laser beam welding, or a combination thereof under a plurality of conditions and from various weld metal compositions; correlating the weld conditions and weld metal compositions to the weld properties; selecting the weld conditions from the data base that will produce a weld having the property or set of properties best suited to the intended application; subjecting the components to fusion welding, friction stir welding, electron beam welding, laser beam welding, or a combination thereof under the conditions selected to form a welded structure, wherein the weld comprises a precipitation hardened nickel based alloy weld metal composition including greater than or equal to 1.4 wt % aluminum and titanium combined and 15 to 30 wt % chromium based on the total weight of the precipitation hardened nickel based alloy weld metal composition, and wherein the yield strength of the welds is greater than or equal to 551.6 MPa.

These and other forms of the novel precipitation hardened high strength nickel based alloy weld compositions, methods of welding with such compositions, and applications of such compositions in oil and gas applications disclosed herein will become apparent upon a reading of the detailed description which follows.

DETAILED DESCRIPTION

The present disclosure is directed at novel nickel based alloy weld compositions that undergo precipitation hardening for joining higher strength steels (greater than 80 Ksi (551.6 MPa) yield strength) in order to achieve superior mechanical properties such as fatigue strength, or precipitation capacity of the weldment. Currently, austenitic alloys, such as Inconel 625, are used to weld high strength steel, such as X-65 grade line pipe steel. The strength of the Inconel 625 welds is about 70 Ksi (482.6 MPa) which provides the required overmatch for the X-65 steel (65 Ksi (448.2 MPa) yield strength). Inconel 625 includes 22 wt % Cr, 9 wt % Mo, 3 wt % Nb, 5 wt % Fe, 0.6 wt % Al+Ti and the balance Ni. Over matched welds for greater than 80 Ksi (551.6 MPa) yield strength steels require nickel alloy weld metal compositions which would have yield strength of about 90 Ksi (620.5 MPa) or higher, which requires novel weld metal compositions to achieve an overmatched condition. It is advantageous to achieve the required strength in a single phase nickel alloy where the sole source of strengthening is through strengthening precipitates. Using the nickel weld metal compositions disclosed herein, higher weld strength is obtained through strengthening precipitates formed during cooling of the weld.

Although weldment properties may be influenced by the weld procedure, it has been discovered that a comparable or greater effect can be achieved if the weld metal has a composition and properties that are substantially different from those of the base steel components to be welded. Specifically, the thermal expansion coefficient of the weld metal and the ability to control the phase transformation temperature (in some systems) provide the ability to better control the weld metal properties. In addition, the crystal structure of the weld metal (e.g. cubic vs. hexagonal) and its effect on the mechanical flow can have a significant effect on weldment properties. It has been discovered that precipitation hardened nickel based alloy metal compositions can be tailored to achieve specific properties for enhanced weldment integrity when joining ferrous and non-ferrous based metal components.

U.S. patent application Ser. No. 11/901,488 filed on Sep. 19, 2007 discloses metal structures and methods of forming such structures for use in oil, gas and/or petrochemical applications that are joined with non-ferrous weld metal compositions or a high alloy weld metal compositions. The welded metal structures include two or more segments of ferrous or non-ferrous components, and fusion welds, friction stir welds or a combination thereof bonding adjacent segments of the components together, wherein the welds comprise a non-ferrous weld metal composition or a high alloy weld metal composition that is substantially different from the metal composition of the two or more components. The resultant welded structures exhibit improvements in fatigue resistance, toughness, precipitation capacity, strength, stress corrosion cracking resistance, and hydrogen embrittlement resistance compared to traditional iron-based weld compositions. U.S. patent application Ser. No. 11/901,488 is herein incorporated by reference in its entirety.

The present disclosure relates to the design of specific weld metal chemistries to achieve higher strength of nickel alloy fusion welds, friction welds, laser beam welds, and/or electron beam welds through precipitation hardening in the as-welded condition. The as-welded conditions means that weld does not undergo a separate heat treatment step after welding, but is simply cooled after the welding step to produce the advantageous properties disclosed herein. The specific nickel alloy based weld metal chemistries may be incorporated within existing welding practices and can be performed with existing hardware. It has been discovered that the precipitation hardening response of nickel based alloy welds may be controlled by the chemistry of the alloy. It has also been discovered that the addition of certain other alloying elements, such as Al, Ti, Nb, Hf, Zr, V and/or Ta, to nickel increases the precipitates needed to enhance the properties of the weldment. Therefore, chemistries of nickel alloys with specified concentrations of Al, Ti, Nb, Ta, Hf, Zr, V and/or other precipitating elements provide higher strength welds for joining ferrous metals. The combination of Al and Ti has been found to be effective precipitating elements in nickel based alloys.

The present disclosure provides for higher strength nickel based alloy welds and methods of achieving such welds through precipitation hardening. The strengthening of nickel alloy welds via precipitation hardening in the as-welded condition has not been previously identified. Conventionally, precipitation hardened nickel alloys are strengthened by an aging heat treatment that consists of exposing the alloy to intermediate temperatures, in the range of 500 to 800° C. However, it is not practical or economical to heat treat welds to achieve strength. Weld metal strength needs to be achieved in the as-welded condition. In order to achieve weld metal strength through precipitation hardening, the composition of the weld metal has to be tailored to induce precipitation during the natural solidification or cooling of the weld. This is accomplished by carefully controlling the supersaturation of the weld metal with respect to the elements present, such as Al, Ti, Nb and similar precipitation hardening elements. If the supersaturation of the elements is too low, the weld metal may not attain adequate strength. On the other hand, if the supersaturation is excessive, the weld metal strength may be too high with an attendant decrease in the ductility and toughness. It has been discovered that a specified amount and combination of these precipitation hardening elements have to be present to achieve adequate strength and toughness in the nickel based weld.

In one advantageous form of the present disclosure, the high strength nickel based alloy weld compositions disclosed herein include a combination of aluminum and titanium as precipitating elements. The aluminum may range from 0.5 to 6.0 wt %, or 0.5 to 5.0 wt %, or 0.5 to 2.5 wt %, 1.0 to 2.0 wt %, or 1.07 to 1.7 wt %, or 1.13 to 1.5 wt %, or 1.28 to 1.50 wt % of the nickel based weld metal composition. In one advantageous form, the aluminum is at least 1.0 wt % of the nickel based weld metal composition. The titanium may range from 0.5 to 4.0 wt %, or 0.9 to 2.5 wt %, or 0.9 to 2.0 wt %, or 1.5 to 2.0 wt %, or 1.56 to 1.96 wt %, or 1.60 to 1.85 wt % of the weld metal composition. In one advantageous form, the titanium is at least 1.0 wt % of the nickel based weld metal composition. The combined aluminum and titanium in the weld metal composition may range from 2.0 to 8 wt %, or 2.5 to 6.0 wt %, or 2.5 to 5.0 wt %, or 3.0 to 5.0 wt %, or 3.0 to 4.0 wt %. In one advantageous form, the combined aluminum and titanium is greater than or equal to 1.4 wt %, or greater than or equal to 2.0 wt %, or greater than or equal to 3.0 wt %, or greater than or equal to 4.0 wt %, or greater than or equal to 5.0 wt %, based on the total weight of the nickel based alloy weld metal composition in order to attain high strength after precipitation hardening. With both aluminum and titanium are present in the nickel based weld metal composition, precipitates including nickel, aluminum and titanium are formed upon cooling of the weld. Titanium is effective in assisting with rapid nucleation of the precipitates formed during precipitation hardening.

In addition, other precipitating elements, including, but not limited to Nb, Ta, Hf, Zr, V, and combinations thereof, may also be present or substitute for either the aluminum or titanium in the nickel based weld metal composition. These other precipitating elements (Nb, Ta, Hf, Zr, V, and combinations thereof), may range from 0.5 to 4.0 wt %, 0.5 to 2.5 wt %, or 1.0 to 2.0 wt %, or 1.5 to 2.0 wt % of the nickel-based weld metal composition. In order to achieve the strength in the as welded condition, the amount of precipitation hardening elements (e.g. Al, Ti, Nb, Ta, Hf, Zr, V, and combinations thereof) should be in a specific range. To achieve strength levels higher than 80 Ksi, the total amount of these combined elements may be at least 2 wt %. Very high concentrations of these combined elements (e.g. greater than 8 wt %) may result in very high strengths, but poor toughness.

In another advantageous form of the nickel based weld metal compositions disclosed herein, chromium may also be present in the range of 10 to 30 wt %, or 15 to 30 wt %, or 15 to 28 wt %, or 15 to 20 wt %, or 20 to 25 wt %. Chromium may be added to the nickel based alloy to decrease solubility of the precipitate phase formed during precipitation hardening. These compositions also include a combination of aluminum and titanium to assist in formation of precipitation hardening in the as-welded form. In yet another advantageous form of the nickel based weld metal compositions disclosed herein, cobalt may be present in the range of 1 to 20 wt %, or 2 to 15 wt %, or 3 to 10 wt %. In still yet another advantageous form of the nickel based weld metal compositions disclosed herein, molybdenum may be present in the range of 1 to 20 wt %, or 2 to 15 wt %, or 3 to 10 wt %. In still yet another advantageous form of the nickel based weld metal compositions disclosed herein, a combination of chromium, molybdenum, and cobalt may also be present in the range of 10 to 30 wt %, or 15 to 30 wt %, or 15 to 28 wt %, or 15 to 20 wt %, or 20 to 25 wt %. Cobalt, molybdenum and/or chromium provide for solid solution strengthening and also enhance the effectiveness of the precipitation hardening elements.

Non-limiting exemplary commercially available nickel based alloys, which provide for precipitation hardening when used as a weld metal to join ferrous and non-ferrous substrates, include wrought iron nickel based alloys, such as Inconel 718, and cast nickel based alloys, such as MAR-M200. The composition of Inconel 718 is as follows: 52.5 wt % Ni, 18.5 wt % Fe, 19 wt % Cr, 0.9 wt % Ti, 0.5 wt % Al, 5.13 wt % Nb+Ta combined, 3.05 wt % Mo, and 1 wt % max. Co. The composition of MAR-M200 is as follows: 5.0 wt % Ni, 2.0 wt % Ti, 12.5 wt % W, 9.0 wt % Cr, 1.0 wt % Nb, 10.0 wt % Co, 0.15 wt % C, 0.015 wt % B, 0.05 wt % Zr, and the balance Ni. Inconel 718 has a combined Ti and Al content of 1.4 wt %, but also includes the additional precipitating elements Nb and Ta at 5.13 wt % combined. Hence, the total wt % of precipitating elements in Inconel 718 is 6.53 wt %. MAR-M200 has a combined Ti and Al content of 7.0 wt %, and also includes the additional precipitating element Nb at 1.0 wt %. Hence, the total wt % of precipitating elements in MAR-M200 is 8.0 wt %.

Alternatively, the nickel based alloy for precipitation hardening may be a non-commercial nickel based alloy. Non-limiting exemplary non-commercial nickel based alloys suitable for precipitation hardening include those in Table 1 below. The combined aluminum and titanium loadings in Table 1 range from 3 to 6 wt % of the alloy. Some wires also include other alloying elements, such as Mo for solid solution strengthening or Nb for precipitation hardening. The volume % of the precipitation hardened gamma phase should be between 20 and 38%. The amount of gamma phase strengthening for each of the non-Mo containing nickel based weld metal chemistries would range from a lower level of strengthening for Wire #1 to a higher level of strengthening for Wire #3. For these non-Mo containing alloys, higher strengthening would result from a higher combined Al and Ti loading (Wire #1 (4 wt %), Wire #2 (5 wt %), Wire #3 (6 wt %)), and the corresponding % volume increase in the gamma phase (Wire #1 (25 vol %), Wire #2 (32 vol %), Wire #3 (38 vol %)).

TABLE 1

Nickel based Weld Metal Chemistries

| Wire | Ni | Cr (wt %) | Mo (wt %) | Fe (wt %) | Al (wt %) | Ti (wt %) | Al + Ti (wt %) | Nb (wt %) | Estimated Vol. % Gamma Phase |
|---|---|---|---|---|---|---|---|---|---|
| 1 | Bal | 20 | 0 | 0 | 2 | 2 | 4 | 0 | 25 |
| 2 | Bal | 20 | 0 | 0 | 2.5 | 2.5 | 5 | 0 | 32 |
| 3 | Bal | 20 | 0 | 0 | 3 | 3 | 6 | 0 | 38 |
| 4 | Bal | 20 | 10 | 0 | 2 | 2 | 4 | 0 | 25 |
| 5 | Bal | 20 | 10 | 0 | 3 | 1 | 4 | 0 | 30 |
| 6 | Bal | 15 | 3 | 18 | 2 | 1 | 3 | 5 | 20 |

Alternatively, the nickel based weld metal compositions may be made up of a combination of suitable commercial nickel based alloys (Inconel 718 and MAR-M200), and non-commercial nickel based alloys (see Table 1 above). The nickel based alloys disclosed herein may also include Cr and other alloying elements. Additional nickel based alloy chemistries to achieve high strength via precipitation hardening may also be designed to meet target strengths based on the strength of the metals to be joined. Hence, when joining higher strength metals via fusion, friction stir, electron beam, or laser beam welding, a higher strength nickel based alloy weld metal composition will be required to achieve an overmatched condition of the weldment relative to the metal structure for joining.

The present disclosure also includes the design of weld metal chemistry that provides superior strength and toughness in the as-welded condition. No heat treatment or aging of the weld area is necessitated with the weld metal compositions disclosed herein. In one particularly advantageous form of the present disclosure, the nickel based weld metal compositions include a combination of chromium, titanium and aluminum. With high chromium levels, less aluminum and titanium is needed for strength and ductility. In contrast, with low chromium levels, more aluminum and titanium is needed for strength and ductility. Non-limiting exemplary weld metal chemistries that result in adequate precipitation hardening are shown in Table 1 above.

Generally, with fusion welding, friction stir welding, electron beam welding, or laser beam welding, the cooling rate is dictated by the ambient conditions surrounding the welding area. However, the current disclosure also comprehends artificial means for cooling the weldment to further increase and control the cooling rate of the weldment to further tailor the strain hardening response of the nickel based alloy weld metal compositions disclosed herein. Such means for artificially cooling the weldment after fusion, friction stir, laser beam and electron beam welding include, but are not limited to, forced air convention, liquid cooling (advantageously water), wherein the temperature of the cooling medium (e.g. water, air or other fluid) is controlled.

The current disclosure also relates to the use of such precipitation hardened nickel based alloy weld metal compositions to join steel structures (replacing conventionally used steels weld metals and Inconel 625) to achieve high performance joints. The weld metal plays a key role in the properties of the weldments. Replacement of conventional steel weld metals and Inconel 625 with the high strength precipitation hardened nickel based alloy weld metal compositions disclosed herein enhances the weldment integrity in several ways. First, the precipitation hardened high strength nickel based alloy weld metal compositions disclosed herein may enhance the strength and toughness of the welds as a result of their inherent microstructures. Second, the precipitation hardened high strength nickel based alloy weld metal compositions disclosed herein may enhance the integrity of the weldment through their effect on the residual stress as a result of their effect on the physical properties such as coefficient of thermal expansion, latent heat of fusion, higher phase transformation temperature and different high temperature flow stress. The difference in these properties compared to steel component/structure being welded provides opportunities to enhance weldment properties, such as fatigue, HAZ and weld metal strength and toughness.

In one aspect, the precipitation hardened high strength nickel based alloy weld metal compositions disclosed herein are useful in welding cast irons and carbon steel components. In another aspect, the precipitation hardened nickel based alloy weld metal compositions disclosed herein are particularly useful in welding high carbon steels, especially those having a CE equal to or greater than 0.48. Exemplary, but not limiting, plain carbon and alloy steels include, AISI 1010, 1020, 1040, 1080, 1095, A36, A516, A440, A633, A656, 4063, 4340, and 6150. Exemplary, but not limiting, high carbon steels include, AISI WI, SI, O1, A2, D2, M1, and API L80. In another aspect of the present disclosure, the precipitation hardened high strength nickel based alloy weld metal compositions disclosed herein are useful in welding ferrous corrosion resistant alloys, including but not limited to, stainless steel. Exemplary, but not limiting, stainless steels include, AISI 409, 446, 304, 316L, 410, 440A, 17-7PH and duplex stainless steel. In a further aspect of the present disclosure, the precipitation hardened high strength nickel based alloy weld metal compositions disclosed herein are useful in treating/welding non-ferrous alloys, including, but not limited to, titanium alloys, cobalt alloys, iron-nickel alloy, and nickel alloys. In still a further aspect of the present disclosure, the precipitation hardened high strength nickel based alloy weld metal compositions disclosed are useful in welding high strength steel liners, such as X-65 and X-80 steel pipe.

The precipitation hardened high strength nickel based alloy weld metal compositions disclosed herein may be welded using all conventional fusion welding methods, including, but not limited to: SMAW (Shielded Metal Arc Welding), SAW (Submerged Arc Welding), GMAW (Gas-Metal SRc Welding), FCAW (Flux Cored Arc Welding), PAW (Plasma Arc Welding), ESW (Electroslag Welding), EGW (Electrogas Welding), RW (Resistance Welding), and OFW (Oxyfuel Gas Welding). In addition, the precipitation hardened high strength nickel based alloy weld metal compositions may be welded by solid state methods, such as friction stir welding (FSW) or a combination of fusion welding methods and solid state welding methods (FSW). The benefits of FSW are primarily derived from the following characteristics: (1) lower temperatures required to perform the joining and lower temperatures in the joint cause less detrimental effects in the adjoining base metal (e.g., coarse grains); (2) high degree of plastic deformation resulting from the rotation of the tool which results in fine grain size which is conducive to improved strength and toughness; and (3) avoidance of hydrogen embrittlement in weldments as compared to fusion welds, which are often prone to hydrogen embrittlement from the decomposition of the residual moisture in the arc. The use of FSW welding in oil, gas and petrochemicals applications is disclosed in U.S. patent application Ser. No 11/643,528, herein incorporated by reference in its entirety.

The advantageous properties provided by using the precipitation hardened high strength nickel based alloy weld metal compositions disclosed herein, include one or more of the following non-limiting properties, increased fatigue resistance, increased toughness, increased precipitation capacity, increased tensile strength, increased stress corrosion cracking resistance, higher hydrogen embrittlement resistance and an enhanced overmatched condition relative to the substrate being welded.

Applications

The precipitation hardened high strength nickel based alloy weld metal compositions disclosed herein find particular application in joining high strength metal substrates (ferrous and non-ferrous) where an overmatched condition of the weldment yield strength relative to the meal substrate is advantageous. Non-limiting exemplary metal substrates include high strength steels (X-65, X-80, etc.), high strength nickel alloys and high strength titanium alloys.

The precipitation hardened high strength nickel based alloy weld metal compositions disclosed herein may be used in the welding of duplex stainless steels (duplex s.s. or DSS). Duplex s.s. derives its strength and corrosion resistance from a controlled balance of ferrite and austenite phases. The desired mixture of phases in the bulk duplex s.s. is achieved by controlled hot working and/or a combination of cold working and annealing treatments. However, when duplex s.s. is welded, the steel is heated to a very high temperature in a single phase ferrite region and cools to the duplex phase upon cooling to room temperature. In order to achieve the required balance of phases in the weldment at room temperature, the cooling rate of the weld has to be controlled. In practice, the cooling rate varies considerably affecting the phase balance and thus the resultant properties of the weldment. The welding of duplex s.s. using the precipitation hardened high strength nickel based alloy weld metal compositions disclosed herein may provide improved joint properties.

The precipitation hardened high strength nickel based alloy weld metal compositions disclosed herein may be used to form welds, for example as spot welds and butt welds, as well as to repair weld areas. More particularly, the nickel based alloy weld compositions disclosed herein may be used to join and repair/treat respectively steel structures and structural components associated with the oil, gas and petrochemical industry. The weld compositions disclosed herein may be utilized either in a manufacturing facility such as a steel mill where the components are made or in the field of fabrication yard where the components are assembled. The fusion welding, friction stir welding, electron beam welding, laser beam welding, and combinations thereof using the precipitation hardened high strength nickel based alloy weld metal compositions disclosed herein are also suitable for forming and repairing/treating structures in oil and gas exploration, production and refining applications. FSW is particularly advantageous for forming spot welds and butt welds of tubular components in these types of applications.

Exemplary, but non-limiting, structures in the oil and gas exploration, production, refining industry where the novel precipitation hardened high strength nickel based alloy weld metal compositions disclosed herein are suitable include high strength pipeline weld areas, SCR and TTR weld areas, threaded components, oil drilling equipment weld areas (i.e. two sections of a deep water oil drill string), Liquified Natural Gas (LNG) and Pressurized Liquified Natural Gas (PLNG) or Compressed Natural Gas (CNG) container weld areas, riser/casing joints, and well head equipment.

In oil and gas upstream applications, the novel precipitation hardened high strength nickel based alloy weld metal compositions disclosed herein are also suitable for joining and repairing structures and components used in natural gas transportation and storage type applications. In particular, the precipitation hardened nickel based alloy weld metals disclosed herein may be utilized to enable gas transportation technologies ranging from pipelines, compressed natural gas (CNG), pressurized liquefied natural gas (PLNG), liquefied natural gas (LNG) and other storage/transportation technologies. In one form in natural gas transportation and storage type applications, the weld compositions disclosed herein may be used for the joining/processing of pipelines, flow lines, gathering lines, expansion loops, and other transmission lines. In another form in natural gas transportation and storage type applications, the weld compositions disclosed herein may be used for joining/processing of materials made of carbon steels, high strength steels, cast irons, structural steels, or corrosion resistant alloys comprising steels, cast irons, stainless steels, duplex stainless steels, nickel or cobalt based alloys, titanium based alloys, other Fe—Ni alloys (e.g. Invar) or joining of other dissimilar metals (e.g. steel and nickel). In yet another form in natural gas transportation and storage type applications, the weld compositions disclosed herein may be used for the joining/processing of LNG, CNG, and PLNG storage and/or transportation structures. This includes modular LNG structures, shipping vessels, transferring components and pipelines, and related technologies (e.g. 9% Ni tanks, Invar tanks).

In oil and gas exploration and production applications, the precipitation hardened high strength nickel based alloy weld metal compositions disclosed herein also may be utilized for joining and repairing various structures used for oil and gas well completion and production. These structures include, but are not limited to, offshore and onshore production structures, oil pipelines, oil storage tanks, casing/tubing, completion and production components, cast structure to flow line connections, subsea components, downhole tubular products (e.g. OCTG), topsides and related structures, umbilicals, tender and supply vessels, and flare towers. More particularly, exemplary offshore production structures include jacketed platforms, mobile offshore drilling units and related production components like casings, tendons, risers, and subsea facilities. Mobile offshore drilling units include, but are not limited to, semi-submersibles and jack-up rigs, TLPs, DDCVs, compliant towers, FPSO, FSO, ships, tankers and the like. Exemplary subsea components include, but are not limited to, duplex, manifold systems, trees, and BOPs. Exemplary topsides and related structures include deck superstructures, drilling rigs, living quarters, helidecks, and related structures. It should be understood that FSW may be used to form the welds comprising such structures and components and FSP may be used to repair and treat the welds or joints comprising such structures.

In downstream applications, the precipitation hardened high strength nickel based alloy weld metal compositions disclosed herein are suitable for joining and repairing structures and components used in refining and chemical plants. The weld compositions disclosed herein provide advantages in the refining and chemicals plant applications through, inter alia, repair of components/structures, dissimilar metal joining, joining of steel structures and joining of difficult to weld materials, such as cast iron. These applications include, but are not limited to, cast iron, heat exchanger tubes and low and high-temperature process and pressure vessels. Exemplary low and high-temperature process and pressure vessels include steam cracker tubes, steam reforming tubes, and refinery structures and components.

The precipitation hardened high strength nickel based alloy weld metal compositions disclosed herein also find application in a number of industries other than oil, gas and petrochemical. For example, transportation (including automotive), construction and appliance industries are areas where the precipitation hardened high strength nickel based alloy weld metal compositions disclosed herein may also find benefit in the joining of metal structures.

In the practice of the present disclosure, whether performing fusion welding, FSW, FSP, laser beam welding, or electron beam welding with the novel weld compositions disclosed herein, the process is conducted under conditions sufficient to provide a weld joint or crack repair having a preselected property or set of properties based on the intended use of the weldment. For example, if the use of the weldment requires toughness over fatigue, the conditions are chosen to favor a weld having those properties.

In one form of the welding methods utilizing the precipitation hardened high strength nickel based alloy weld metal compositions disclosed herein, a data base of weld properties, including but not limited to toughness, strengths, precipitation or contraction, hardness, fatigue, grain size and the like, for various base metals is obtained and correlated to the welding conditions under which the weld or repair was performed. Then when a property or set of properties is chosen for weld joint for an intended application, the weld compositions and welding or repair conditions employed are selected from those conditions that produce the chosen property or properties.

As will be readily appreciated, the work pieces described in the above embodiments need not be formed of the same base metal. Similarly, the weld metal composition need not be formed of the same metal as the work pieces. Thus the work pieces are formed generally of a ferrous material and the weld metal comprising the weld compositions disclosed herein of a different material (precipitation hardened high strength nickel based alloy weld metal compositions disclosed herein). However the work pieces may be formed of a non-ferrous material (such as a nickel based alloy) and welded with precipitation hardened high strength nickel based alloy weld metal compositions disclosed herein.

EXAMPLES

Eight experimental samples or trials were made of various nickel based weld metal wire compositions. All compositions contained chromium at 15 to 28 wt %. The chromium was added to decrease gamma phase (γ') solubility. All compositions also included a combination of aluminum and titanium to assist in formation of precipitation hardening in the as-welded form upon natural cooling. Titanium was added to assist with rapid nucleation of the gamma phase. The combined aluminum and titanium loadings varied from 2.5 to 3.5 wt % of the alloy. Phase II chemistries were chosen to form rapid precipitation of a gamma prime (γ') phase upon cooling from welding. The γ' is the primary strengthening phase in heat treatable Inconel alloys (e.g., 718), and long, high temperature heat treatments are typically needed to generate desired microstructure in traditional precipitation hardening. In this experiment, the concept of Phase II wires was to increase amount of γ' formers (Al and Ti) to precipitate this phase upon natural cooling from welding (as-welded) to avoid the need for subsequent aging or heat treatment. Cored wires were produced for flexibility and quick turn-around time. Welds were made with temper passes to aid in formation of the γ' phase.

The compositional results of the eight experimental samples are included in Table 2 below with all percentages in wt %.

TABLE 2

Exemplary Nickel-based Alloy Weld Wire Chemistry

| Weld Wire ID # | Wire Name | Al, % | Ti, % | Al + Ti, % | Al/Ti | Cr, % | Ni, % |
|---|---|---|---|---|---|---|---|
| High Cr | | | | | | | |
| 2 | Polymet Lot #05003406 part #EXXO62LWS03 | 1.22 | 1.60 | 2.82 | 0.7625 | 23.91 | Bal |
| 3 | Polymet Lot #05003410 part #EXXO62LWS01 | 1.13 | 1.56 | 2.69 | 0.7244 | 22.62 | Bal |
| 5 | Polymet Lot #05003408 part #EXXO62LWS02 | 1.07 | 1.61 | 2.68 | 0.6646 | 22.49 | Bal |
| 7 | Polymet Lot #05003404 part #EXXO62LWS04 | 1.50 | 1.95 | 3.45 | 0.7692 | 27.21 | Bal |
| 8 | Polymet Lot #05003547 part #EXXO62LWS02B | 1.34 | 1.85 | 3.19 | 0.7243 | 21.98 | Bal |
| 9 | Polymet Lot #05003400 part #EXXO62LWS05 | 1.40 | 1.96 | 3.36 | 0.7143 | 27.80 | Bal |
| Low Cr | | | | | | | |
| 4 | Polymet Lot #05003555 part #EXXO62LWS05 | 1.70 | 0.88 | 2.58 | 1.9318 | 16.70 | Bal |
| 10 | Polymet Lot #05003554 part #EXXO62LWS04B | 1.28 | 1.64 | 2.92 | 0.7805 | 15.68 | Bal |

The properties of the weld metal (as-welded condition) in a ¾" thick plate joint of two of the experimental nickel-based alloys (wires 8 and 9) are shown in Table 3 below. For a ¾" plate thickness, the combined Al and Ti concentrations had to be greater than or equal to 3 wt % to provide an ultimate tensile strength of 119 ksi (820.5 MPa) and greater.

TABLE 3

Exemplary Tensile Properties for Selected Weld Metals

| Wire ID # | Lot | 0.2% YS (ksi) | UTS (ksi) | % Elong. | % Red. Area |
|---|---|---|---|---|---|
| 9 | Polymet Lot #05003400 part #EXXO62LWS05 | 100.6 | 131.8 | 17.0 | 40 |
| 8 | Polymet Lot #05003547 part #EXXO62LWS02B | 88.5 | 122.7 | 24 | 35 |
| | | 90.4 | 119.2 | 19 | 21 |

YS = Yield strength,
UTS = Ultimate tensile strength,
Elong. % = Elongation %

Applicants have attempted to disclose all forms and applications of the disclosed subject matter that could be reasonably foreseen. However, there may be unforeseeable, insubstantial modifications that remain as equivalents. While the present disclosure has been described in conjunction with specific, exemplary forms thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. All numerical values within the detailed description and the claims herein are also understood as modified by "about."

What is claimed is:

1. A weldment consisting of: two or more segments of ferrous components, and fusion welds bonding adjacent segments of the components together, wherein the welds comprise a precipitation hardened nickel based alloy weld metal composition including between 1.4 and 4.0 wt % of combined aluminum and titanium based on the total weight of the nickel based alloy weld metal composition, wherein the ferrous components are high strength steel chosen from X-65 steel or X-80 steel, wherein the weldment is not subjected to heat treatment after welding, and wherein the precipitation hardened nickel based alloy weld metal composition is not subjected to heat treatment prior to welding.

2. The weldment of claim 1 wherein the combined aluminum and titanium is between 2.0 and 4.0 wt %.

3. The weldment of claim 1 wherein the combined aluminum and titanium is between 2.0 and 3.0 wt %.

4. The weldment of claim 1 wherein the titanium is at least 1.0 wt % based on the total weight of the nickel based alloy weld metal composition.

5. The weldment of claim 1 wherein the aluminum is at least 1.0 wt % based on the total weight of the nickel based alloy weld metal composition.

6. The weldment of claim 1 further including chromium at 15 to 30 wt % based on the total weight of the nickel based alloy weld metal composition.

7. The weldment of claim 1 further including greater than or equal to 1 wt % Mo.

8. The weldment of claim 1 further including greater than or equal to 1 wt % Co.

9. The weld gent of claim 1 further including an additional precipitating element chosen from Nb, Ta, Hf, Zr, V, and combinations thereof.

10. The weldment of claim 9 wherein the additional precipitating element is at least 0.5 wt % based on the total weight of the nickel based alloy weld metal composition.

11. The weldment of claim 1 wherein the nickel based alloy weld metal composition includes 52.5 wt % Ni, 18.5 wt % Fe, 19 wt % Cr, 0.9 wt % Ti, 0.5 wt % Al, 5.13 wt % Nb+Ta combined, 3.05 wt % Mo, and 1 wt % max. Co.

12. The weldment of claim 1 wherein the yield strength of the weld rent is greater than or equal to 551.6 MPa.

13. The weldment of claim 1 wherein the method of forming the fusion welds is chosen from SMAW, SAW, GMAW, FCAW, PAW, ESW, EGW, RW, and OFW.

14. The weldment of claim 1 wherein the weldment exhibits one or more of increased fatigue resistance, increased toughness, increased tensile strength, increased stress corrosion cracking resistance, higher hydrogen embrittlement resistance, and increased overmatched condition relative to the two or more ferrous components.

15. The weldment of claim 1 for use in welding structures in the oil, gas and petrochemical industry, the transportation industry, the appliance industry and the construction industry.

16. The weldment of claim 15 wherein the structures in the oil, gas and petrochemical industry include high strength pipelines, steel catenary risers, top tension risers, threaded components, liquefied natural gas containers, pressurized liquefied natural gas containers, deep water oil drill strings, riser/casing joints, well-head equipment, flow lines, gathering lines, transmission lines, shipping vessels, transferring components, storage tanks, and expansion loops.

17. The weldment of claim 15 wherein the structures in the oil and gas industry are used in oil and gas well completion and production structures and components.

18. The weldment of claim 17 wherein the oil and gas well completion and production structures and components are chosen from cast structures to flow connections, subsea components, casing/tubing, completion and production components, downhole tubular products, oil pipelines, oil storage tanks, off-shore production structures/components, topsides, deck superstructures, drilling rigs, living quarters, helidecks, umbilicals, tender and supply vessels, and flare towers.

19. The weldment of claim 18 wherein the off-shore production structures/components are chosen from jacketed platforms, mobile offshore drilling units, casings, tendons, risers, subsea facilities, semi-submersibles, jack-up rigs, TLPs, DDCVs, compliant towers, FPSO, FSO, ships, and tankers.

20. The weldment of claim 18 wherein the subsea components are chosen from duplexes, manifold systems, trees and BOPs.

21. The weldment of claim 15 wherein the structures are used in oil and gas refinery and chemical plant structures and components, and wherein the oil and gas refinery and chemical plant structures and components are chosen from cast iron components, heat exchanger tubes, and low and high temperature process and pressure vessels.

22. The weldment of claim 21 wherein the low and high temperature process and pressure vessels are chosen from steam cracker tubes, and steam reforming tubes.

23. The weldment of claim 1 further including a friction stir weld, an electron beam weld, a laser beam weld, or a combination thereof on top of said fusion weld.

24. A method, of joining two or more metal structures comprising:
providing two or more segments of ferrous components, and
fusion welding adjacent segments of the components together, wherein the welds consist of a precipitation hardened nickel based alloy weld metal composition including between 1.4 and 4.0 wt % of combined aluminum and titanium based on the total weight of the nickel based alloy weld metal composition, wherein the ferrous components are high strength steel chosen from X-65 steel or X-80 steel, wherein the weldment is not subjected to heat treatment after welding, and wherein the precipitation hardened nickel based alloy weld metal composition is not subjected to heat treatment prior to welding.

25. The method of claim 24 wherein cooling of the welds occurs under ambient conditions or using an artificial means for increasing the cooling rate of the welds.

26. The method of claim 24 wherein the combined aluminum and titanium is between 2.0 and 3.0 wt %.

27. The method of claim 24 wherein the titanium is at least 1.0 wt % based on the total weight of the nickel based alloy weld metal composition.

28. The method of claim 24 wherein the aluminum is at least 1.0 wt % based on the total weight of the nickel based alloy weld metal composition.

29. The method of claim 24 further including chromium at 5 to 30 wt % based on the total weight of the nickel based alloy weld metal composition.

30. The method of claim 24 further including greater than or equal to 1% Mo.

31. The method of claim 24 further including greater than or equal to 1 wt % Co.

32. The method of claim 24 further including an additional precipitating element chosen from Nb, Ta, Hf, Zr, V, and combinations thereof, wherein the additional precipitating element is at least 0.5 wt % based on the total weight of the nickel based alloy weld metal composition.

33. The method of claim 24 wherein the nickel based alloy weld metal composition includes 52.5 wt % Ni, 18.5 wt % Fe, 19 wt % Cr, 0.9 wt % Ti, 0.5 wt % Al, 5.13 wt % Nb+Ta combined, 3.05 wt % Mo, and 1 wt % max. Co.

34. The method of claim 24 wherein the yield strength of the welds is greater than or equal to 551.6 MPa.

35. The method of claim 24 wherein the fusion welding step is chosen from SMAW, SAW, GMAW, FCAW, PAW, ESW, EGW, RW, and OFW.

36. The method of claim 24 wherein the friction stir welding step conditions include rotational speed, load and travel speed of the friction stir weld tool used to affect the weld.

37. The method of claim 24 wherein the welds exhibit one or more of increased fatigue resistance, increased toughness, increased tensile strength, increased stress corrosion cracking resistance, higher hydrogen embrittlement resistance, and increased overmatched condition relative to the two or more ferrous components.

38. The method of claim 24 for use in welding structures in the oil, gas and petrochemical industry, the transportation industry, the appliance industry and the construction industry.

39. The method of claim 38 wherein the structures for use in the oil, gas and petrochemical industry include high strength pipelines, steel catenary risers, top tension risers, threaded components, liquefied natural gas containers, pressurized liquefied natural as containers, deep water oil drill strings, riser/casing joints, well-head equipment, flow lines, gathering lines, transmission lines, shipping vessels, transferring components, storage tanks, and expansion loops.

40. The method of claim 39 wherein the structures for use in the oil, gas and petrochemical industry are used in oil and gas well completion and production structures and components.

41. The method of claim 40 wherein the oil and gas well completion and production structures and components are chosen from cast structures to flow connections, subsea components, casing/tubing, completion and production components, downhole tubular products, oil pipelines, oil storage tanks, off-shore production structures/components, topsides, deck superstructures, drilling rigs, living quarters, helidecks, umbilicals, tender and supply vessels, and flare towers.

42. The method of claim 41 wherein the off-shore production structures/components are chosen from jacketed platforms, mobile offshore drilling units, casings, tendons, risers, subsea facilities, semi-submersibles, jack-up rigs, TLPs, DDCVs, compliant towers, FPSO, FSO, ships, and tankers.

43. The method of claim 41 wherein the subsea components are chosen from duplexes, manifold systems, trees and BOPs.

44. The method of claim 38 wherein the structures are used in oil and gas refinery and chemical plant structures and components, and wherein the oil and gas refinery and chemical plant structures and components are chosen from cast iron components, heat exchanger tubes, and low and high temperature process and pressure vessels.

45. The method of claim 44 wherein the low and high temperature process and pressure vessels are chosen from steam cracker tubes, and steam reforming tubes.

46. The method of claim 24 further including friction stir welding, electron beam welding, laser beam welding, or a combination thereof after said fusion welding step.

47. A method for welding two or more ferrous components to produce a weld having a specific property or set of properties chosen for an intended application, the method comprising:
obtaining a data base of weld properties for nickel based welds formed by fusion welding under a plurality of conditions and from various weld metal compositions;
correlating the weld conditions and weld metal compositions to the weld properties;
selecting the weld conditions from the data base that will produce a weld having the property or set of properties best suited to the intended application;
subjecting the components to fusion welding, friction stir welding, electron beam welding, laser beam welding, or a combination thereof under the conditions selected to form a welded structure,
wherein the weld consists of a precipitation hardened nickel based alloy weld metal composition including between 1.4 and 4.0 wt % of combined aluminum and titanium and 15 to 30 wt % chromium based on the total weight of the precipitation hardened nickel based alloy weld metal composition, and wherein the yield strength of the welds is greater than or equal to 551.6 MP, and
wherein the ferrous components are high strength steel chosen from X-65 steel or X-80 steel, wherein the weldment is not subjected to heat treatment after welding, and wherein the precipitation hardened nickel based alloy weld metal composition is not subjected to heat treatment prior to welding.

\* \* \* \* \*